Figure 1:
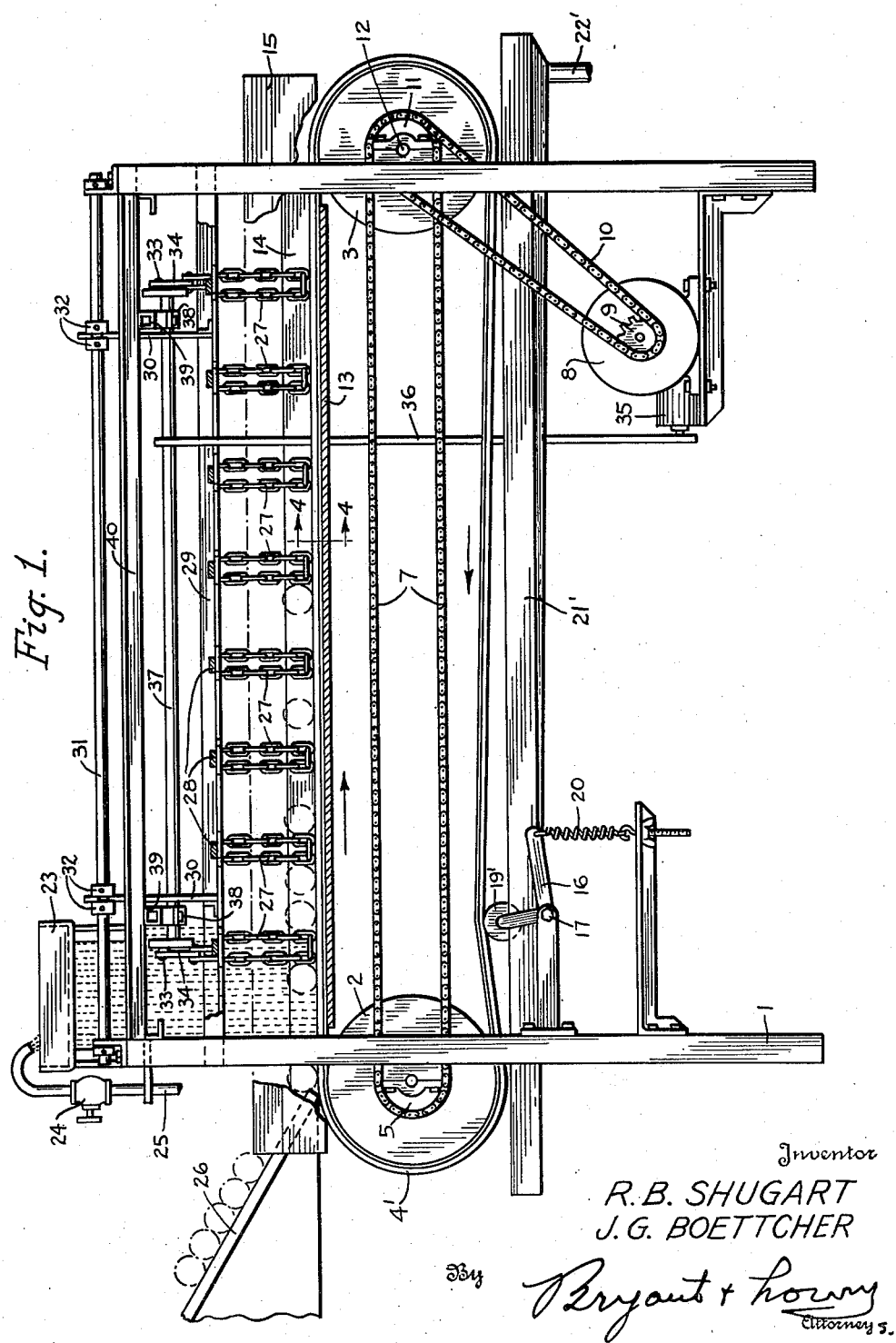

July 10, 1951 — R. B. SHUGART ET AL — 2,560,487
FRUIT COATING APPARATUS
Filed June 17, 1947 — 2 Sheets-Sheet 1

Inventor
R. B. SHUGART
J. G. BOETTCHER
By Bryant & Lowry
Attorneys

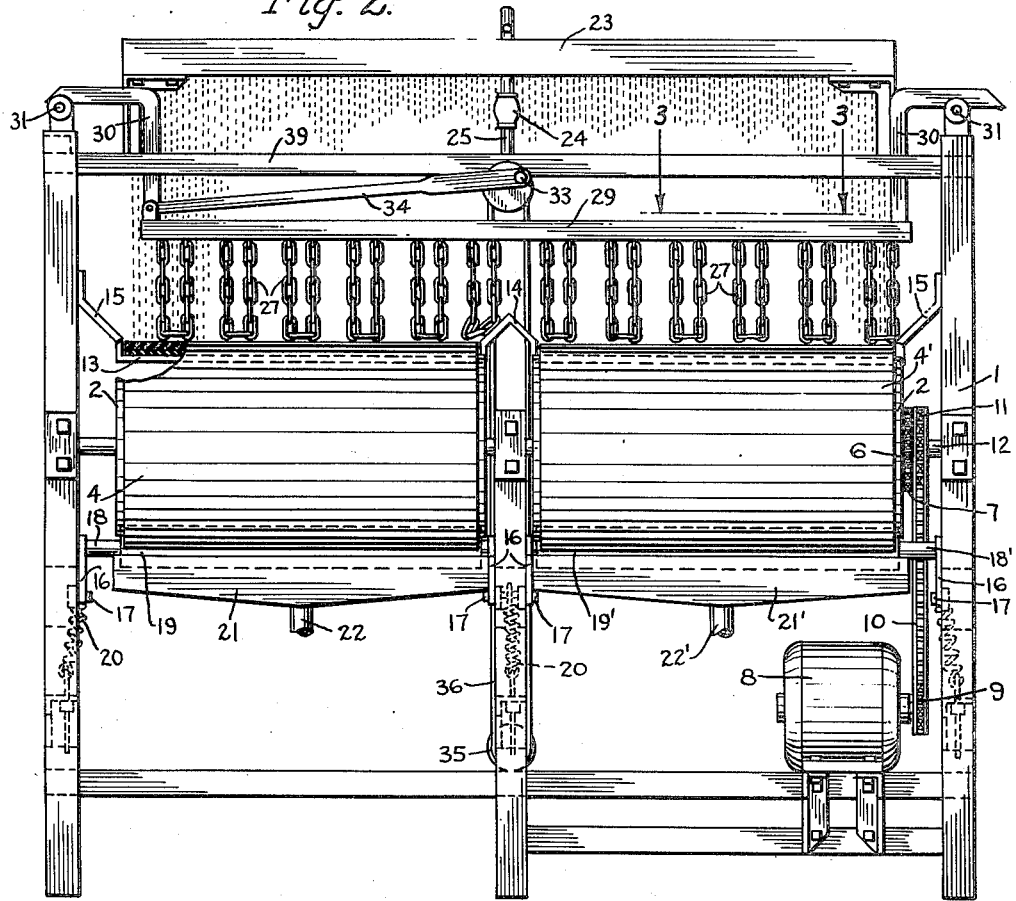
July 10, 1951     R. B. SHUGART ET AL     2,560,487
FRUIT COATING APPARATUS
Filed June 17, 1947     2 Sheets-Sheet 2
Fig. 2.
Fig. 4.
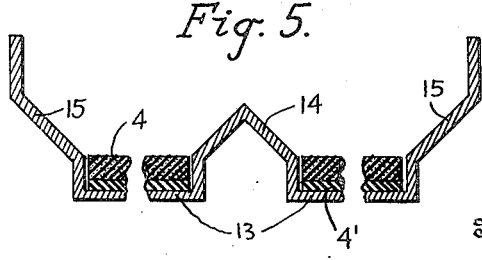
Fig. 3.
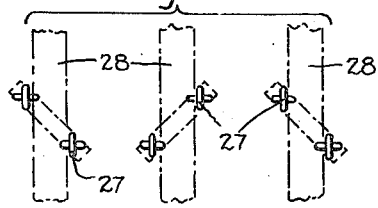
Fig. 5.
Inventor
R. B. SHUGART
J. G. BOETTCHER
By Bryant & Lowry
Attorneys Patented July 10, 1951

2,560,487

UNITED STATES PATENT OFFICE 2,560,487

FRUIT COATING APPARATUS

Robert B. Shugart and Justus G. Boettcher, Orlando, Fla.

Application June 17, 1947, Serial No. 755,126

7 Claims. (Cl. 91—18)

This invention relates to improved means for applying protective coatings and the like to fruit of generally rotund shape.

The object of this invention is to provide apparatus for wetting the entire surface of the fruit with one or more liquids with a delicate rubbing-in action, and removing all but a microscopic film from the convex surface thereof.

Another object is to provide apparatus for thoroughly drenching fruit fed thereto in a detergent liquid, and removing all but a microscopic film thereof on the entire convex surface of the fruit.

Another object is to provide apparatus for processing fruit and the like to increase its marketability by soaking it thoroughly in a suitable liquid for inhibiting decay, retarding shrinkage, producing a polishing coating, or for other purposes; then removing the excess of the liquid, leaving a substantially uniform but microscopic coating over the entire convex surface of the fruit, amounting to no more than a mere dampness.

A further object is to provide apparatus as defined above in which the soaking is performed by spraying the liquid over the fruit.

A further object is to provide apparatus as defined above, in which the removing is done by rolling the fruit over a layer of sponge rubber or the like, wherein the depressions, due to the weight of the fruit, in the surface of the sponge rubber, cause the extremities of the pores and foramina in the sponge rubber to expand as each depression moves over them, along the leading half of the depression, and to contract and return to their normal size as the depression passes them, or along the trailing half of the depression, thus causing a gentle rubbing action between the convex surface of the fruit in the depression and the surface of the sponge rubber, the liquid in the sponge rubber being squeezed ahead of the leading half of the depression, leaving a comparative void in the pores and foramina behind and below the trailing half of the depression, and causing a wiping and sucking action to remove all but a microscopic film on said fruit surface.

A further object is to provide apparatus as defined above, in which the soaking and removing processes are both performed by the fruit rolling over the layer of sponge rubber or the like, the amount of the liquid in the sponge rubber being regulated to produce puddles of the liquid in the leading halves of the depressions to wet the fruit without running over into the trailing halves of the depressions, which still act to remove the excess liquid from the surface of the fruit immediately after it is wetted.

A further object is to provide the wetting process by regulating the amount of liquid in the sponge rubber to produce decided puddling in one section of the sponge rubber over which the fruit is caused to roll first, and to produce the removing effect in a succeeding section of the sponge rubber surface over which the fruit is then rolled.

A further object is to provide apparatus as defined above, including a moving belt having the sponge rubber layer thereon, over which the fruit is rolled by suspended obstacles of flexible, semi-flexible, or rigid form, said obstacles being inclined to the line of motion of said belt at different angles, to cause changes in direction of rolling of said fruit along its course through said apparatus, so as to affect the entire surface of the fruit.

A further object is to provide apparatus as defined above, wherein said obstacles are reciprocated transversely with respect to the motion of said belt, in order to increase the effectiveness of the changes in direction of rolling of the fruit.

A further object is to provide a shower of the liquid over the fruit as it enters the belt section in the above apparatus to produce the soaking process.

A further object is to provide two or more of these belts as defined above, in series, using different liquids in the treatment over each belt.

A further object is to use a detergent liquid to inhibit decay in the first process and follow it up by a treatment with an emulsion for reducing shrinkage in the second process.

Other and more specific objects will become apparent in the following detailed description of an apparatus having one belt in two parallel sections, and constructed in accordance with the present invention, illustrating one form of device which may be used as an element in a machine comprising one, two, or more of these apparatuses in series.

Reference will be had to the accompanying drawings, wherein:

Figure 1 is a side elevational view, partly broken away and in section, of a device illustrating the present invention, Figure 2 is an end view thereof, as viewed from the left end of Figure 1, Figure 3 is a detail schematic view showing the arrangement of the obstacles, as viewed along the line 3—3 of Figure 2, Figure 4 is an enlarged detail sectional view of a part of a belt, taken at 4—4 in Figure 1, and Figure 5 is an enlarged broken sectional view of a portion of the belts and their supports.

The device illustrated comprises a frame 1, on which are mounted a pair of rollers 2 and 3 having a pair of endless belts 4 and 4', and sprockets 5 and 6 connected by chain 7 for simultaneous rotation thereof. The rollers are driven by a motor 8 having a sprocket 9 connected by chain 10 to sprocket 11 on the shaft 12 of rollers 3. The belts 4 and 4' are supported by flat supports 13 connected together by center guard ridge 14 and mounted by sides 15 to the frame 1.

A bell-crank 16 pivotally mounted at 17 is provided at each end of shafts 18 and 18' on which rollers 19 and 19' are rotatably mounted. Each bell-crank 16 is biased by an adjustable tension spring 20 to vary the roller pressure against the sponge rubber belt, and thus controls the amount of liquid retained in the belt as it moves over roller 4 or 4' to the top of the supports 13. The liquid squeezed out of the belts by rollers 19 and 19' falls into drip pans 21 and 21' which are provided with drain outlets 22 and 22'. A shower tray 23 is mounted across the top of frame 1 and has a perforated bottom for spraying the liquid entering the belt sections. The amount of liquid thus sprayed may be controlled by a control valve 24 in the supply line 25, in accordance with the speed of the belt sections, the amount of liquid retained in the belt after passing rollers 19 and 19', and the amount of liquid desired in the belt during the ensuing treatment.

Any suitable feeding means may be used to bring the fruit to the belt sections 4 and 4', such as the inclined plane structure 26, shown in Figure 1.

As the fruit enters these belt sections it settles into depressions formed in the surface of the sponge rubber by its weight, and tends to go along with the moving belt, being guided thereon by the center guard ridge 14 and the sides 15. All along the belt to the other end of the device, however, there are obstacles 27, illustrated in the form of chains in the drawings, suspended at intervals from hanger bars 28 mounted in a suspension frame 29 hung by hanger arms 30 slidably over side rods 31 which may be rotatably mounted along the sides of the device in the top of the frame 1. Guide collars 32 on rods 31 guide the hanger arms 30 so as to keep the suspension frame 29 against axial displacement. This suspension frame is reciprocated transversely of the device by means of crank pins 33 and connecting rods 34 operated by motor 35 through the drive belt connection 36 to the crank shaft 37 hung in bearings 38 mounted on cross pieces 39 supported at their ends by the upper side bars 40 of frame 1.

The obstacles 27 may be rigid, semi-rigid, or flexible, although they are illustrated in the present device as chains, and hang close to the sponge rubber surface. They are arranged angularly with respect to the movement of the belt so as to have an inherent tendency to displace the interfering fruit laterally on the belt. The reciprocating movement sideways, as provided by the sliding motion of the suspension frame 29, produces an added impetus on the fruit and ensures its being rolled over the sponge rubber surface from side to side so that the entire convex surface of the fruit will receive the full effect of the treatment. The flexibility of the chain prevents bruises even on delicate fruit. For harder fruit, such as oranges and other citrus fruits, semi-rigid or even rigid obstacles may be used.

Among the uses to which the device herein described may be put is the treatment of fresh fruit by wetting the surface, including the stem end and the surfaces of tissue exposed by scratches through the skin or by larger wounds, with a solution of a substance lethal to organisms which produce decay, of requisite concentration and for a period of time sufficient to ensure efficient inhibiting action for protection of the fruit against deterioration through the development of mold and other decay producing organisms, then, without dilution of the solution adhering to the fruit and absorbed into the exposed tissue, removing the surplus solution from the convex surface thereof down to the state of mere dampness through the action of the sponge rubber, leaving the solution with undiminished strength in the stem end and in such wounds as may be present. This retention of an ample amount of the solution in full strength in the more vulnerable parts of the fruit surface greatly extends the period of protection, as contrasted with the conventional practice of rinsing the fruit in water after treatment with the antiseptic solution, for the purpose of removing surplus solution, which if left shows an appreciable white bloom upon drying, particularly in an atmosphere of low humidity. Such rinsing incidentally dilutes the solution at the stem end and in the wounds, if any, impairing its protective strength. The microscopic film of solution left upon the convex surface of the fruit by using the present device was found to be insufficient to show any bloom whatever upon drying.

Another use is the treatment of fresh fruit to retard shrinkage, and incidentally to apply a polishing effect to the surface of the fruit, by wetting the surface with an aqueous emulsion of wax or waxes and removing the surplus emulsion therefrom with the gentle rubbing-in action afforded by the sponge rubber surface, as previously described.

Another use is the preparation of fresh fruit for marketing, wherein two of the present devices might be used in series. The first one may be used for the decay inhibiting treatment, as described above, and the second for the shrinkage retarding and polishing treatment. The condition of mere dampness which attends the surface of the fruit at the end of the first treatment is the ideal condition of the surface for the second treatment in order to ensure complete wetting of the fruit by the emulsion in the second treatment.

These and many other methods may be carried out by one or more of the devices herein described. Obviously, changes in the arrangement and type of obstacles 27, and in the thickness and quality and other characteristics of the sponge rubber on the belts, as well as the type and control of the liquid used may be made, depending on the desired results and requirements of the particular type of fruit being treated, without departing from the spirit and scope of the invention, as defined by the appended claims.

What is claimed, is:

1. In assemblages for applying protective coatings and the like to fruit of general rotund shape, wherein a succession of fruit members are subjected to the coating treatment as individuals, an assemblage of such type comprising, in combination, an endless conveyor movable linearly at constant speed and mounted to present a level surface to provide a fruit member travel path on to which the fruit members are successively delivered, power means for such conveyor, said conveyor having its fruit-bearing face formed of sponge-like rubber material yieldable under fruit member weight thereby to advance the members through such path, a coating emulsion station positioned in the entrance zone to such travel path for supplying the coating material to the conveyor and passing fruit members with the emulsion delivery of shower type, and obstacle means positioned above such travel path and depending into such path for moving the fruit members on and relative to such surface, said obstacle means being bodily movable in paths transverse to the direction of advance of the conveyor to thereby vary the axis relationship of fruit members with the surface as the members are advanced through the path and thereby apply an even and continuous but microscopic coating on each member amounting to no more than dampness.

2. An assemblage as in claim 1 characterized in that the conveyor fruit-bearing surface is normally planar with sponge rubber as the material of which it is formed to thereby permit the weight of the fruit member to increase the area of contact of member and surface by the formation of a slightly depressed zone of the surface to spread and apply the coating to the member surface during member advance.

3. An assemblage as in claim 1 characterized in that the obstacle means includes an elongated frame positioned above the member travel path and operatively connected with the conveyor power means and with the frame supported to be bodily movable in the transverse path by power means activity to cause frame reciprocation in such path, said frame carrying a plurality of individual obstacle members arranged in spaced relation and depending from the frame into the path of advance of the fruit members.

4. An assemblage as in claim 3 characterized in that the obstacle frame includes spaced supports extending longitudinally of the fruit member travel path, with each support carrying a succession of spaced obstacle members, and with obstacle members of the several supports in general transverse alinement.

5. An assemblage as in claim 4 characterized in that successive obstacle members of a support are arranged in pairs with the members of a pair located on opposite sides of the support and spaced apart in fore and aft relation in the direction of length of the support.

6. An assemblage as in claim 5 characterized in that corresponding obstacle members of adjacent pairs of obstacle members on adjacent supports are transversely alined with the fore and aft arrangement of members reversed to thereby present the obstacle members of a support as in fore and aft relation and corresponding pair members of adjacent supports positioned within the space between such adjacent supports and with such corresponding members in transverse alinement.

7. An assemblage as in claim 1 characterized by an emulsion collecting receptacle beneath the conveyor, and a tensioned roller above the collecting receptacle and operative on the conveyor for squeezing emulsion from the conveyor.

ROBERT B. SHUGART.
JUSTUS G. BOETTCHER.

REFERENCES CITED

The following references are of record in the file of this patent:

UNITED STATES PATENTS

| Number | Name | Date |
|---|---|---|
| 249,029 | Brul | Nov. 1, 1881 |
| 942,951 | Wild | Dec. 14, 1909 |
| 1,195,854 | Dawson | Aug. 22, 1916 |
| 1,464,775 | Reuter | Aug. 14, 1923 |
| 1,671,924 | Brogden | May 29, 1928 |
| 1,690,195 | Haley | Nov. 6, 1928 |
| 1,736,759 | Brogden | Nov. 19, 1929 |
| 2,136,118 | Palmer | Nov. 8, 1938 |